United States Patent
Prieschl et al.

[19]

[11] Patent Number: 5,961,048
[45] Date of Patent: Oct. 5, 1999

[54] CONTAINER FOR STORING, TRANSPORTING AND DISPENSING LIQUID, ESPECIALLY WATER FOR DRINKING OR WATERING

[76] Inventors: Herbert Prieschl, Martin-Luther-Strasse 10; Jürgen Wecker, Martin-Luther-Strasse 15, both of Bretzfeld, Germany, D-74626

[21] Appl. No.: 08/875,801
[22] PCT Filed: Jan. 5, 1996
[86] PCT No.: PCT/DE96/00009
§ 371 Date: Jul. 18, 1997
§ 102(e) Date: Jul. 18, 1997
[87] PCT Pub. No.: WO96/22013
PCT Pub. Date: Jul. 25, 1996

[30] Foreign Application Priority Data

Jan. 18, 1995 [DE] Germany ................ 295 00 710 U
Jul. 19, 1995 [DE] Germany ................ 295 11 629 U

[51] Int. Cl.⁶ .................. A01G 25/09; B05B 1/24
[52] U.S. Cl. .................. 239/146; 239/128; 239/351
[58] Field of Search .................. 239/146, 722, 239/723, 373, 337, 128, 351

[56] References Cited

U.S. PATENT DOCUMENTS

| | | | |
|---|---|---|---|
| 3,939,503 | 2/1976 | Nazworth | 239/146 X |
| 3,940,065 | 2/1976 | Ware et al. | 239/146 |
| 4,269,329 | 5/1981 | Keller. | |
| 4,567,563 | 1/1986 | Hirsch | 239/63 X |
| 4,700,892 | 10/1987 | Cunning | 239/289 |
| 4,945,672 | 8/1990 | Raia | 43/57 |
| 5,040,726 | 8/1991 | Dimitri | 239/17 |
| 5,104,016 | 4/1992 | Runkel | 222/105 X |
| 5,111,538 | 5/1992 | Chapman. | |
| 5,154,317 | 10/1992 | Roppolo, III | 222/66 |
| 5,484,538 | 1/1996 | Woodward | 222/192 X |
| 5,506,565 | 4/1996 | De Leon et al. | 340/522 |

FOREIGN PATENT DOCUMENTS

| | | |
|---|---|---|
| 1 453 606 | 9/1966 | France. |
| 2 197 510 | 3/1974 | France. |
| 24 04 341 | 7/1975 | Germany. |
| 28 51 793 | 6/1980 | Germany. |
| 89 01 123 | 5/1989 | Germany. |
| 91 04 697 | 8/1991 | Germany. |
| 295 00 710 U | 5/1995 | Germany. |

OTHER PUBLICATIONS

Mein Schoner Garten, 24(12):26, Nov. 24, 1995.

*Primary Examiner*—Andres Kashnikow
*Assistant Examiner*—Sean P. O'Hanlon
*Attorney, Agent, or Firm*—Darby & Darby

[57] ABSTRACT

A container (10) for storing, transporting and dispensing liquid, especially water for drinking or watering, with a hollow body unit (12), with vehicle rollers (14) present on the underside of the hollow body unit, with an inlet orifice (16), with an outlet orifice (18) and with a handle for pulling the container (10) by rolling, is distinguished in that a solar cell device (22) is arranged on the outside of the container, there is a liquid pump device (24) for pumping off or sucking in, as required, the liquid stored or to be stored inside the hollow body unit (12), and the solar cell device (22) transmits its generated electric power at least partially to the liquid pump device (24).

18 Claims, 5 Drawing Sheets

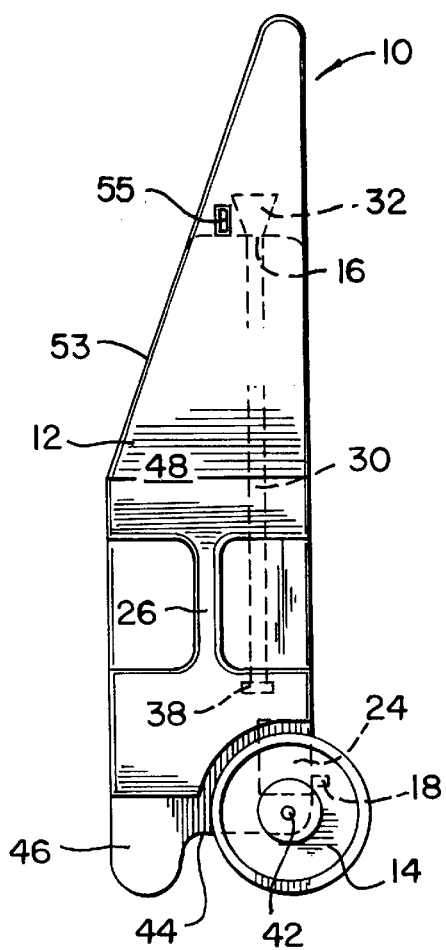
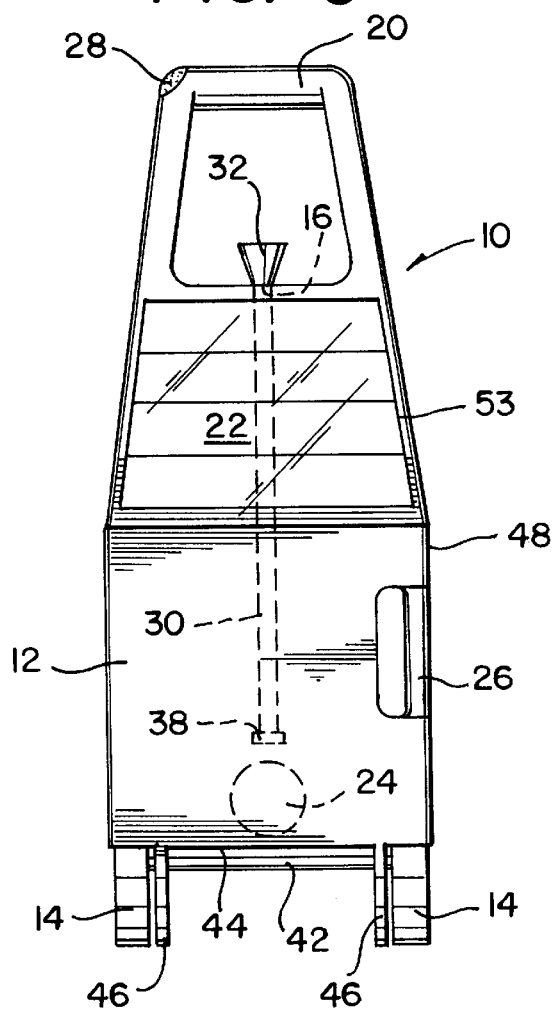
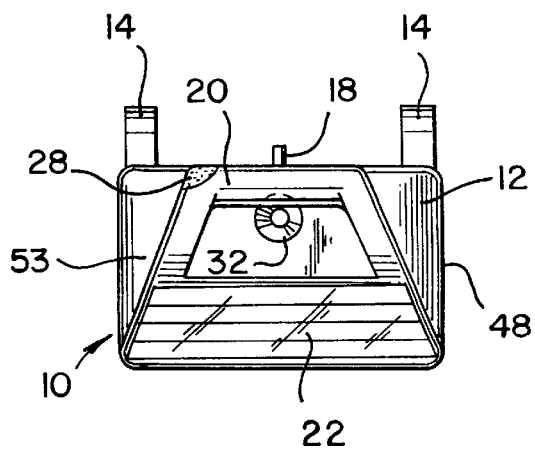

CONTAINER FOR STORING, TRANSPORTING AND DISPENSING LIQUID, ESPECIALLY WATER FOR DRINKING OR WATERING

TECHNICAL FIELD

The present invention relates to a container for storing, transporting and dispensing liquid, especially water for drinking or watering, with a hollow body unit, with vehicle rollers present on the underside of the hollow body unit, with an inlet orifice, with an outlet orifice and with a handle for pulling the container by rolling.

PRIOR ART

Watering with normal watering cans having a volume of, for example, 10 or 15 l (liters) requires relatively great effort and is very laborious. For people who are not very strong or are elderly, it is often a problem which it is scarcely possible to solve, especially when the water point is a long distance from the place of use. This problem is encountered frequently, for example in domestic gardens, allotments and cemeteries, but also in the agricultural or horticultural sector.

German Utility Model G 91 04 697.1 describes a watering can which is distinguished by the presence of traveling rollers which are arranged in that end region of the can lower body side located opposite the can spout, and in that the can spout is designed so as to be lengthened as an actuating lever. This measure improves the handling or transport of the watering can. There remains the problem, however, that the watering can has to be lifted for watering, so that, even here, increased effort is required during the watering operation itself. Furthermore, the can spout is made relatively long, so that it either has to be removed for watering or causes an obstruction during watering as a result of its length.

PRESENTATION OF THE INVENTION

The technical problem or object on which the present invention is based is to specify a container of the initially mentioned type which is improved in comparison with the prior art mentioned and which has a simple design, ensures easy transport and makes watering or water extraction easy and effective.

The container according to the invention is defined by the features of the independent claim 1. Advantageous embodiments and developments are the subject of the dependent claims.

The container according to the invention for storing, transporting and dispensing liquid is accordingly distinguished in that a solar cell device is arranged on the outside of the container, a liquid pump device is present for pumping off or sucking in, as required, the liquid stored or to be stored inside the hollow body unit, and the solar cell device transmits its generated electric power at least partially to the liquid pump device.

A lightweight plastic container is preferably used for the container, care being taken to ensure particular ease of movement of the wheels. The liquid (water) can thereby be transported with little effort. At the same time, the carrying of the heavy liquid load both during the transport operation and during the watering operation is avoided and the body is protected due to the absence of one-sided loading.

An especially preferred embodiment of the container according to the invention is distinguished in that, in the inlet region, there is a flexible hose capable of being pulled out of the hollow body unit as far as a stop. This makes easy filling possible. The flexible hose is pulled out of the container and can easily be led to the water point or the faucet for filling. In a further embodiment, a removable sieve is mounted in the hose, so that floating matter is kept way.

The hollow body unit has a volume in the range of 0 to 40 l (liters), especially approximately 35 l (liters).

A particularly flexible embodiment of the container according to the invention is distinguished in that the container has a carrying grip and watering recesses arranged diametrically to the carrying grip, especially in the corner region of the handle, so that the container can be used as a watering can for watering.

The solar cell device used comprises solar cells of the commercially available type which supply the necessary sufficient current for the installed liquid pump device. The current is supplied directly to the pump via installed cables. The pump may be designed as a pressure pump or suction pump. A pressure pump is employed when the liquid is used for watering or for extraction. An additional suction pump is employed if water has to be sucked in from an extraction point.

A particularly preferred embodiment of the container according to the invention is distinguished in that the solar cell device transmits its electric power to a current storage unit, to which the liquid pump device is connected. A sufficient quantity of electric energy is consequently available at any time and, if required, can be demanded, for example, by actuating a simple switch device.

By means of additional fittings, the container according to the invention can also be used in a versatile manner not only in gardens and cemeteries, but also in the leisure sector and for ensuring the supply of drinking water. Thus, it is possible, by means of an appropriate holding device, to connect a shower device or to supply an assembly for cooling the container content with current via the solar cell device, so that there is the possibility of supplying drinking water, for example in the third world. Furthermore, as already mentioned above, the use of a suction pump operated by solar cells may also be provided, so that the container may also be filled, for example, from troughs or watercourses.

Devices for mixing the container content may also be provided in the hollow body unit, said devices being supplied with current by the solar cell device, so that even a container content consisting of different components can be intermixed homogeneously.

A preferred embodiment of the container according to the invention is distinguished in that the liquid pump device has a first liquid pump unit for pumping off and a second liquid pump unit for sucking in, a further embodiment being distinguished in that the first liquid pump unit is arranged in or on the housing and a second liquid pump unit is arranged in the region of the free end of a flexible hose communicating with the interior of the housing.

The liquid pump units are preferably designed in each case as centrifugal pumps. The provision, in each case, of one centrifugal pump for pumping and a second centrifugal pump for suction ensures permanently reliable functioning with regard to the drive energy obtained by means of solar energy or to the current intensity to be converted therefrom. The first centrifugal pump for emptying the container is located in the container itself and is placed in such a way that the pump gyro empties the container. During this operation, the water is forced out of the container through the centrifugal pump into an emptying hose. The second centrifugal pump for filling the container is located on the free end region of the flexible emptying hose and is installed in such a way that the water is sucked in and forced into the container as a result of the movement of the centrifugal pump. Both pumps are designed in such a way that, during the emptying operation, the water can flow through the sucking pump without any resistance. In the suction mode, the water is then forced through the pumping-off pump, likewise without any resistance, and thus passes into the container. The use of two centrifugal pumps makes it possible to pump the liquid from one pump through the other without any additional effort.

An especially preferred embodiment of the container according to the invention is distinguished in that an inclination switch unit is present in the region of the free end of a hose communicating with the interior of the housing, the liquid pump device or the liquid pump units being capable of being switched in dependence on the inclination of the inclination switch unit.

The end region of the hose is preferably designed as a sprayhead, in which the inclination switch unit is mounted. In this case, the inclination switch unit is arranged in such a way that the circuit for the operation of, for example, the first liquid pump unit is closed only when the sprayhead is inclined downward from the vertical position or out of the horizontal position. Only then is the circuit closed and the pumps can operate. At the same time, the situation where the container empties due to unintentional startup by a master switch on the housing in start position, without this being desired, is reliably prevented. Insofar as the sprayhead is mounted properly on the container, emptying is not possible.

As a rule, therefore, the pumping-off pump is switched whenever the sprayhead points downward.

In particular, this ensures that the container as such is operated advantageously, since, during the spraying or watering of, for example, plants, this operation does not have to be interrupted by the master switch on the housing, but the dispensing of water is determined by the inclination of the inclination switch unit. If the latter is inclined downward, the water is dispensed, and if it is directed upward, that is to say beyond the horizontal, the circuit is broken by the inclination switch and the pump stops. This is highly advantageous and agreeable, since the spraying or watering operation may thereby be interrupted easily. There is also no need to be close to the container for watering.

Further embodiments and advantages of the invention emerge by virtue of the features listed further in the claims and by virtue of the exemplary embodiments specified below. The features of the claims may be combined with one another in any way, insofar as they are not obviously mutually exclusive.

BRIEF DESCRIPTION OF THE DRAWINGS

The invention as well as advantageous embodiments and developments thereof are described and explained in more detail below with reference to the examples illustrated in the drawing. The features to be taken from the description and the drawing may, according to the invention, be used individually in themselves or severally in any combination. In the drawing:

FIG. 2 shows a side view of the container according to FIG. 1 without the flexible hoses, FIG. 3 shows a front view of the container according to FIG. 2, FIG. 4 shows a top view of the container according to FIG. 2.

EMBODIMENTS OF THE INVENTION

Figure 1:
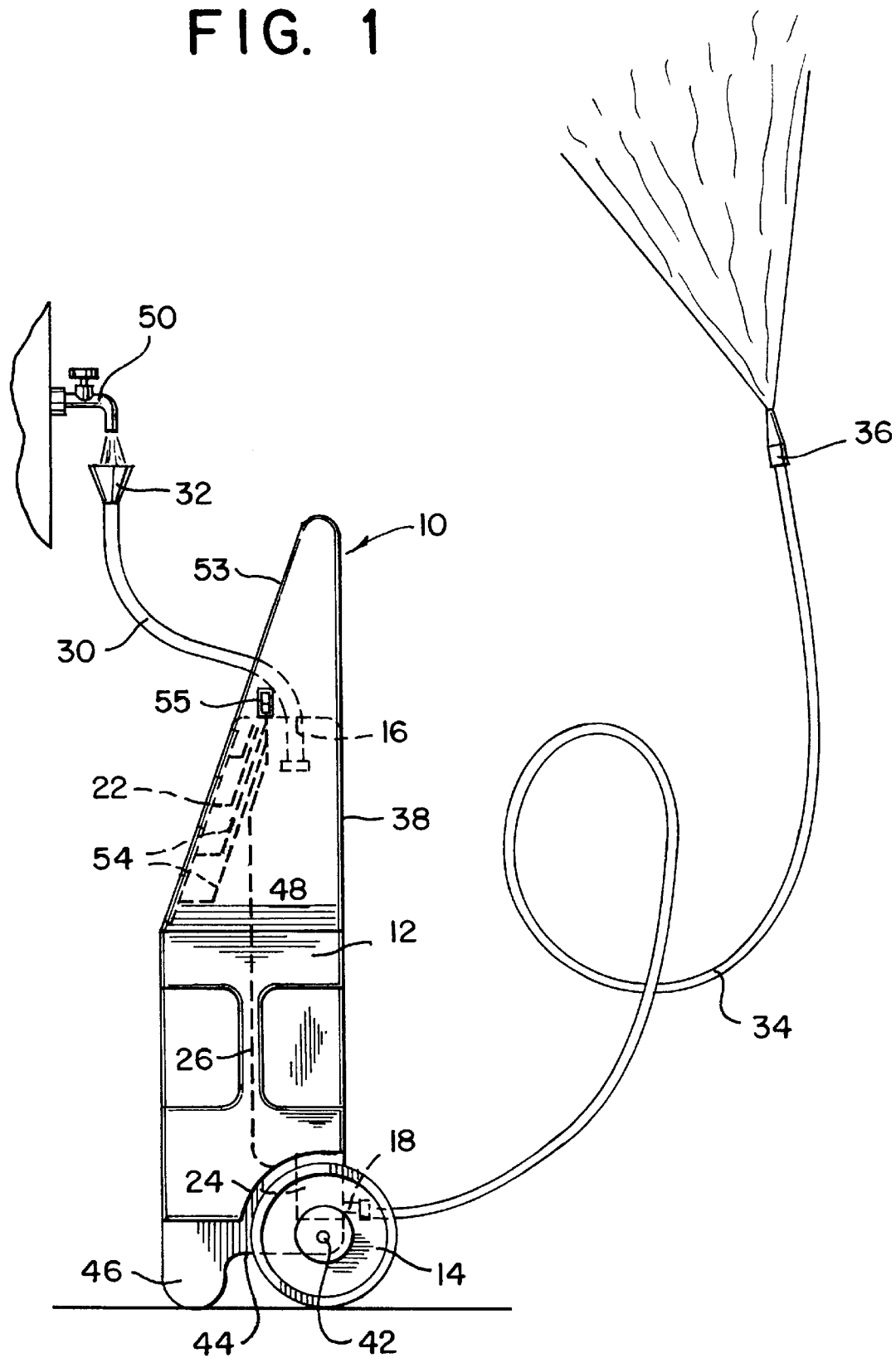
FIG. 1 shows a diagrammatic side view of a container with a flexible filling hose and with a flexible outlet hose having a pressure pump.

FIG. 1 illustrates diagrammatically a container 10 for storing, transporting and dispensing liquid, especially water for watering. The container 10 has a hollow body unit 12 which is, in principle, of parallel-epipedic design and which possesses a cross-sectional region tapering linearly upward. Formed onto the hollow body unit 12 is a handle 20 which is designed in such a way as to produce, in the upper region, a grip which is arranged at an ergonomically correct height for the average person. The container 10 is designed, as a whole, so that the center of gravity of the filled container 10 is relatively far down, so that easy transport and good stability are possible. Two vehicle rollers 14 are arranged, rotatably about a common rotary shaft 42, parallel to and at a distance from one another in the side region on the underside 44 of the container 10. These vehicle rollers 14 serve for transporting the container 10. The vehicle rollers move easily and may consist, in particular, of solid rubber in the tread region. The container 10 is shaped on the underside in such a way that there are two projection units 46 arranged at a distance from one another, so that the container 10 can be set down safely in the vertical form illustrated in FIG. 1, in that it can be supported, on the one hand, on the projection units 46 and on the vehicle rollers 14 located at a distance from the projection unit. The projection units 46 and the vehicle rollers 14 are, at the same time, arranged at such a distance from one another that the filled container stands in a highly stable manner. The projection units 46 are formed integrally onto the underside 44 of the container 10.

Figure 6:
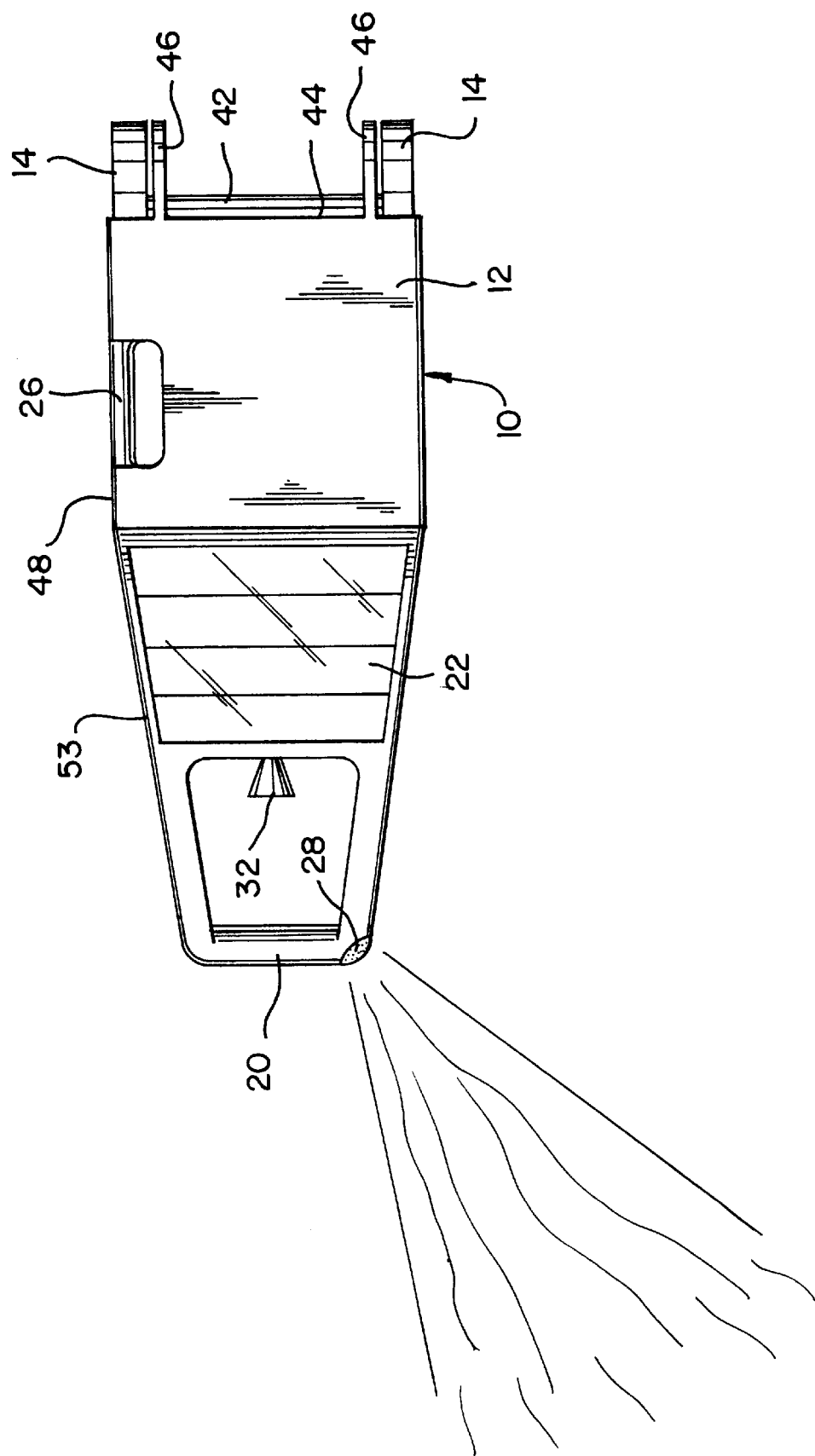
FIG. 6 shows a diagrammatic view of the use of a container according to FIG. 2 as a watering can.

The container 10 is shaped on one side wall 48 in such a way as to produce a carrying grip 26. The container 10 may therefore be brought out of the vertical position into the horizontal position by one of the operator's hands and can thus be carried easily. According to FIG. 6, a pouring orifice with watering recesses 28 is made at the upper end of the container 10, that is to say in the corner region of the handle 20, on the side located diametrically opposite the carrying grip, so that the container 10 can also be emptied manually in the same way as a normal watering can.

To fill the container 10, a flexible hose 30 is fitted below the handle 20 in the middle of the container in the region of an inlet orifice 16 and is provided at one end with a funnel 32 and a filter sieve, not illustrated in any more detail, and at its other end with a stop 38. As a result the hose 30 can be pulled out of the container 10 as far as the stop 38 via a guide ring (not shown) in order to fill the container 10. For filling, the container 10 must be set down next to a water point 50, which is illustrated diagrammatically in FIG. 1 as a faucet, so that the container 10 can then be filled with water by means of the hose 30 and the permanently fitted funnel 32. The installed sieve, not illustrated, is designed to be easily removable and can be cleaned of floating matter. The hose 30, which, when not required, is present in the hollow body unit 12, makes it possible to avoid fitting any additional external repository mounting for the hose. At the same time, the hose 30 is designed in such a way that it can also be removed as a whole from the container 10 and replaced by bending the stop.

The container 10 itself is preferably produced as a plastic container, so that a cost-effective production process by injection molding or blowing is possible. In this case, the container volume is designed in such a way that it is appropriate for the respective instance of use. The volume may vary from approximately 20 l (liters) to 50 l (liters). A container with a larger volume may also be designed without difficulty. In the sloping upper region 53 of the container 10, a solar cell device 22 is mounted on the outside. The solar cell device 22 consists of individual solar cell elements or solar foil elements. In this case, the fastening is designed in such a way that it is permanent. The solar cell device 22 is protected against impacts by a peripheral bead in the container 10, said bead not being illustrated in any more detail in the drawing. The size of the solar cell device 22 and the power are dimensioned in such a way that sufficient current is available for use.

On the opposite side of the solar cell device 22, a liquid pump 24, designed as a pressure pump, is present in the lower region of the container 10 in the region of an outlet orifice 18.

In the region of the outlet orifice 18, the container 10 is prefabricated in such a way that the pump 24 can be introduced into the container 10 and screwed tight by means of a simple waterproof union nut 52. This measure, assisted by additionally sealing inserts, makes it possible to have a permanent, reliable and leakproof fastening of the liquid pump, simple demounting for exchange purposes being ensured at the same time. The pump 24 is connected to the solar cell device 22 via a switch unit 55 by means of current cables 54 separately illustrated diagrammatically in FIG. 1.

The current cables 54 are fastened to the container 10 in such a way that its use is not impaired. The power of the pump 24 is dimensioned in such a way that, on the one hand, the solar cell device 22 supplies the corresponding power and, on the other hand, the water pressure is sufficient to empty the container 10 and to offer optimal operating pressure. Mounted on the outer part of the pump 24 is a flange 58, to which a flexible hose 34, which, during emptying, serves for guiding the liquid to be emptied, may be attached. The connection may be ensured by means of a plug-in connection.

This flexible hose 34 having an appropriate length is provided with a nozzle 36, so that the liquid can be applied conveniently and easily, and, in particular, also while being kept upright, at its place of use, such as, for example, the garden, grave or the like.

The pump 24 is put into and out of operation by the switch unit 55 which is preferably designed as a rocker switch and which is arranged in the upper region of the container 10. This cable connection too is laid in place on the container 10 in such a way that reliable use is ensured.

The container 10 can be designed in terms of its dead weight in such a way that it can be transported without difficulty to the respective places of use. In particular, the carrying grip, which makes use as a "watering can" possible, allows the container according to the invention to be transported easily to the respective place of use for the purpose of using it there.

The container 10 according to the invention may, in particular, also be employed in the leisure and camping sector as a water transporter. Water may therefore be transported easily over long distances and properly stored as well as easily extracted.

The container 10 according to the invention is also suitable for the supply of drinking water, for example in disaster areas where a decentral water supply is to be built up. In particular, in refugee camps there are major problems of water distribution, since large water collecting vehicles usually have only a few dispensing points. In this respect, the container 10 according to the invention has a cooling assembly which is operated by solar cells and which is supplied with current via the solar cell device 22 and is installed on the container 10, so that the drinking water, as a foodstuff, is cooled and is kept in a fresh condition.

In the Figures, identical components bear the same reference symbols and are not explained again.

Figure 5:
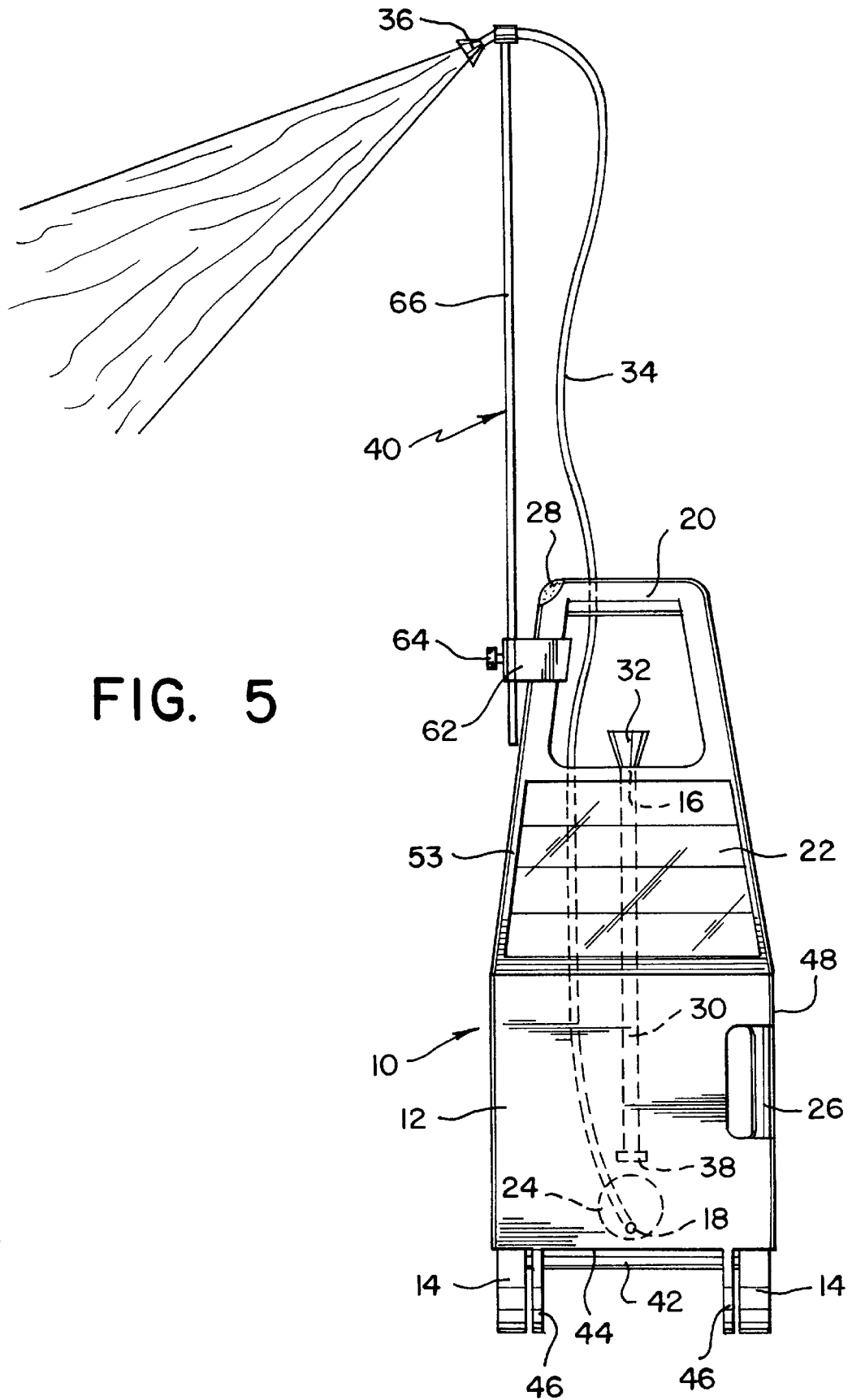
FIG. 5 shows a diagrammatic view of a container with a connected shower device.

For the leisure sector, it is possible for the container 10 according to the invention to be converted into a shower device 40 according to FIG. 5, which is very easy to handle. By means of a mounting 62 preferably extending conically, the shower device 40 is slipped laterally on the handle 20 in the upper region and fixed into position by means of a locking screw 64. For this purpose, a sturdy rod 66, which has in the upper region a mounting for receiving the hose 34, is introduced into the orifice of the locking screw 64.

Inserting the hose 34 into the mounting 62 of the rod 66 produces a shower device 40 which can be set according to body size by means of the locking screw 64. The shower device 40 may be operated by means of a nozzle 36 arranged at the end or with a normal pourer, so that individual setting is possible. The pump 24 operated by solar cells ensures the supply of water and the necessary pressure for the shower operation. By filling the container 10 in good time and positioning it, for example, in a sunny area, the container content can heat up so that an agreeable water temperature is reached.

In a design variant which is not illustrated, the container is equipped with a suction pump. This is necessary, for example, in the field of use when, for example, garden owners have no faucet available, but obtain their water, for example, from lakes, rivers or streams.

The container according to the invention is a highly use-oriented structure which can be produced cost-effectively and which ensures continuous reliable use. Solar energy is employed in order to provide cost-effectively and in an environmentally friendly manner a watering container which is of versatile use.

In a preferred design variant, not illustrated, of the container according to the invention, the vehicle rollers are dimensioned in terms of their diameter in such a way that predetermined or predeterminable step heights can be overcome without difficulty when the container is being transported.

Description of the Solar Module

In addition to supplying the pump with current for the above mentioned field of use, the transmission of solar current is available via a separate connecting bush.

Further external current consumers, which would otherwise require their own solar cell device, may therefore be operated. These may, at the present time, be, for example: pond pumps, solar lamps, fans, coolbags, radios, small compressors, accumulators and many other uses in the horticultural and leisure sectors as well as commercial uses.

Figure 8:
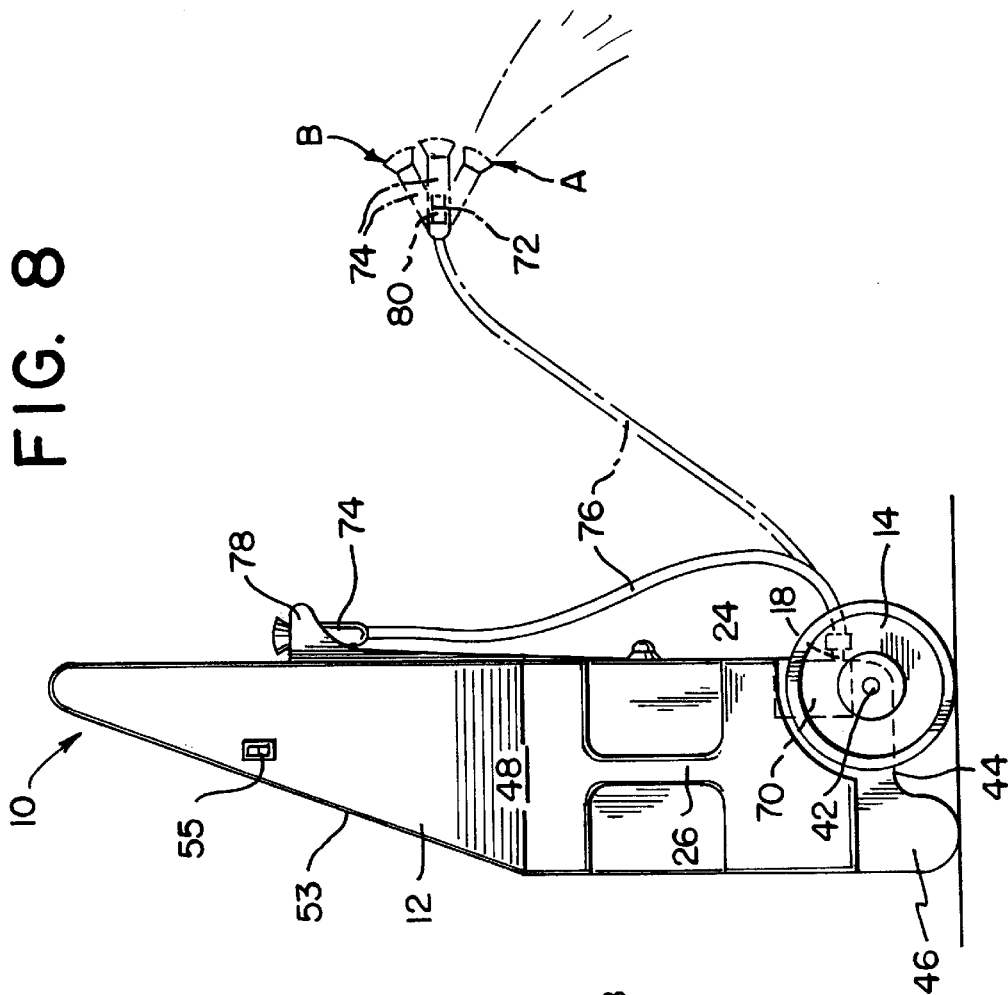
FIG. 8 shows a diagrammatic side view of a container with two liquid pump units.
Figure 7:
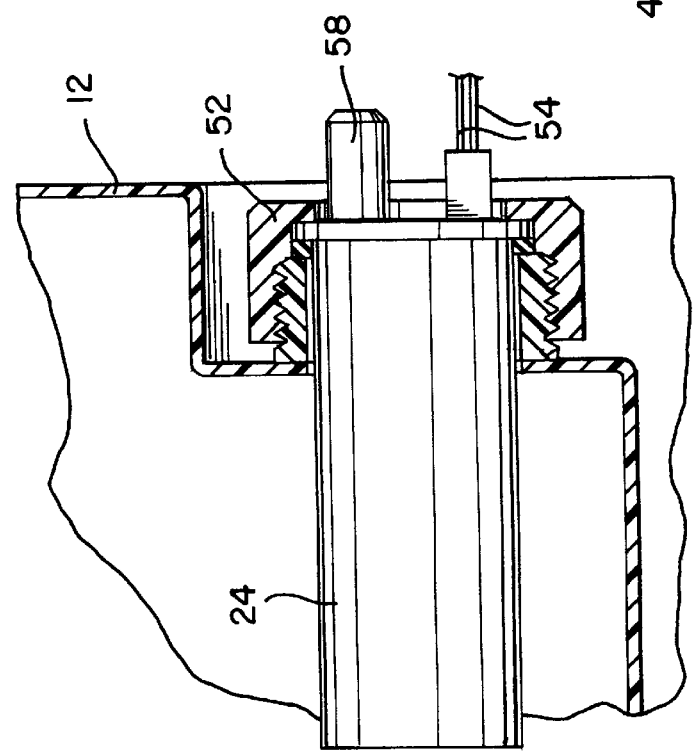
FIG. 7 shows a diagrammatic view of a detail in the connection region of the pressure pump.

In the container 10 illustrated in FIG. 8, in contrast to the container according to FIG. 2, a flexible hose 76 having a sprayhead 74 is connected to the container 10 in the lower region. Identical components bear the same reference symbols as the components according to FIG. 2 and are not explained again.

Another difference is that in the embodiment according to FIG. 8, the liquid pump device is designed as a two-part device with a first liquid pump unit 70, which is arranged in the lower region inside the container 10 and to which the flexible hose 76 is connected, and with a second liquid pump unit 72, which is present in the region of the sprayhead 74 and which is not illustrated in any more detail.

Furthermore, the flexible hose 76 can be fastened releasibly to a holding unit 78 on the container 10, the holding unit 78 being designed in such a way that, when the sprayhead 74 is fastened, the latter is directed essentially upward.

Within the sprayhead 74, there is an inclination switch unit 80 which switches the first liquid pump unit 70 when the sprayhead 74 is held so as to be inclined downward (position A in FIG. 8; illustrated by broken lines). In this position of the sprayhead, the first liquid pump unit 70 has current applied to it and pumps water out of the container interior. As soon as the sprayhead is moved upward (position B in FIG. 8; illustrated by broken lines), the supply of current to the first liquid pump unit 70 is interrupted. This can result in an agreeable watering operation, without switch units located on the container having to be actuated laboriously for watering or for cutting off the water. Furthermore, the actuating positioning during watering may be at a distance from the container, depending on the length of the flexible hose 76.

The container may be filled either via a suction pump or via a faucet through a funnel. In order to avoid overfilling, a design variant which is not illustrated has a filling level indicator unit, by means of which filling can be observed and which indicates the respective filling quantity.

In a design variant which is not illustrated, the solar unit is mounted removably on the housing. The standard type is supplied with current by accumulators which are preferably designed so as to be rechargeable. The solar unit can be delivered as an additional module which, for example, is snapped into prefabricated depressions on the housing and is additionally connected to the accumulator.

We claim:

1. A container for storing, transporting and dispensing liquid, comprising:
    (a) a hollow body unit having an inlet orifice, an outlet orifice, a handle and a lower surface;
    (b) a plurality of vehicle rollers disposed on the lower surface of the hollow body unit;
    wherein
        a solar cell device is disposed on the outside of the container,
        further comprising a liquid pump device, for selectively pumping off or sucking in the liquid stored or to be stored inside the hollow body unit, and
        the solar cell device transmits its generated electric power at least partially to the liquid pump device, and
        a flexible hose communicating with the interior of the hollow body unit and having a free end, wherein an inclination switch unit is present in the region of the free end of the flexible hose, the liquid pump device or the liquid pump units being capable of being switched in dependence on the inclination of the inclination switch unit.

2. The container as claimed in claim 1, wherein the solar cell device transmits its electric power to a current storage unit, to which the liquid pump device is connected.

3. The container as claimed in claim 1, wherein the container has a carrying grip and watering recesses arranged diametrically with respect to the carrying grip, so that the container can be used as a watering can for watering.

4. The container as claimed in claim 1 further comprising a flexible hose having a filling end, the flexible hose extending through the inlet orifice and is selectively partially pulled out of the hollow body unit until said hose abuts a stop.

5. The container as claimed in claim 4, wherein the filling end of the hose is of a funnel-shaped design.

6. The container as claimed in claim 1, wherein there is a refrigerating assembly, to which the solar cell unit at least partially transmits its electric energy, as required.

7. The container as claimed in claim 1, wherein the container or the vehicle rollers are made of plastic.

8. The container as claimed in claim 1, wherein the handle is located at a height at which it can be grasped by the operator without difficulty.

9. The container as claimed in claim 1, wherein the hollow body unit has a parallelepipedic shape.

10. The container as claimed in claim 1, wherein the volume of the hollow body unit is 20 to 50 1 (liters).

11. The container as claimed in claim 10, wherein the volume of the hollow body unit is approximately 35 1 (liters).

12. The container as claimed in claim 1, wherein the container has a current connection unit which has current applied to it by the solar cell device and to which an external current consumption unit can be connected.

13. The container as claimed in claim 1, wherein a shower unit can be fastened releasibly to the container.

14. The container as claimed in claim 1, wherein the liquid pump device has a first liquid pump unit for pumping off and a second liquid pump unit for sucking in.

15. The container as claimed in claim 14, further comprising a flexible hose communicating with the interior of the hollow body unit and having a free end, wherein the first liquid pump unit is arranged in or on the hollow body unit and the second liquid pump unit is arranged in the region of the free end of the flexible hose.

16. The container as claimed in claim 14, wherein the liquid pump units are designed in each case as centrifugal pump assemblies.

17. The container according to claim 1, further comprising:
    (a) an accumulator unit;
    (b) a liquid pump device for pumping off or sucking in the liquid stored or to be stored inside the hollow body unit;
    (c) an accumulator unit which transmits its generated electric power at least partially to the liquid pump device; and
    (d) a bearing unit for the releasible fastening of a solar cell device on the hollow body unit.

18. The container as claimed in claim 1, wherein a hose connection unit is disposed at the outlet orifice.

* * * * *